June 11, 1957 — M. R. SHAW — 2,795,018
DOUBLE-GLAZED CELLS
Filed March 4, 1954 — 2 Sheets-Sheet 1
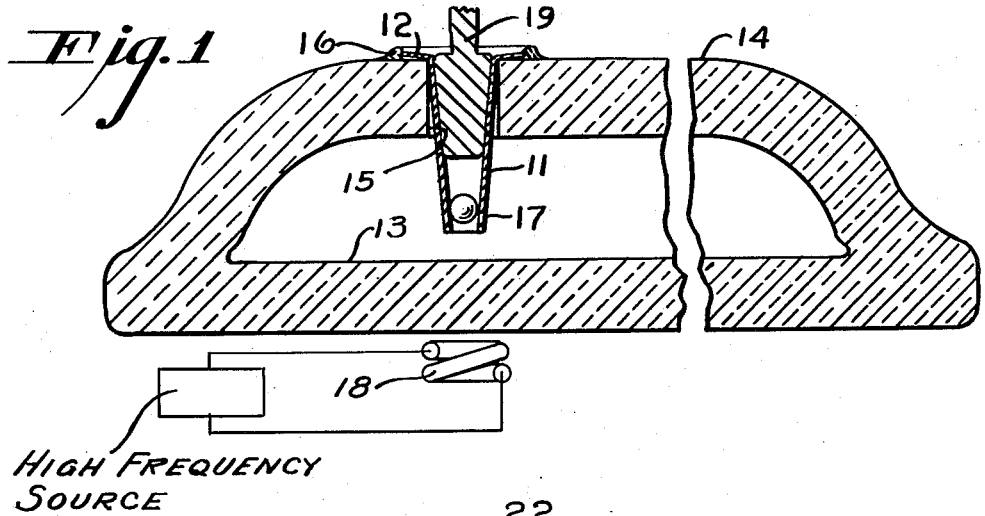
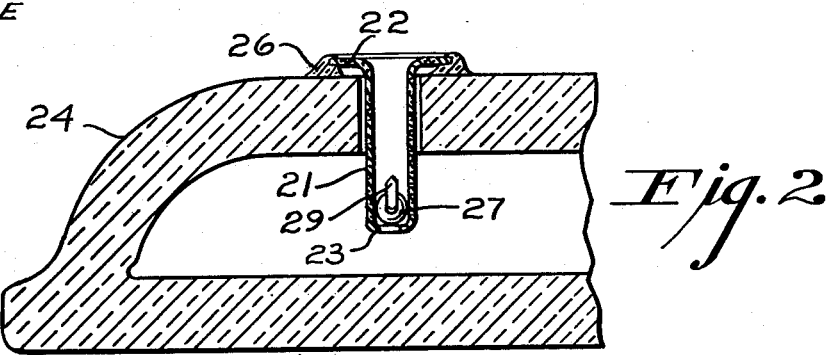
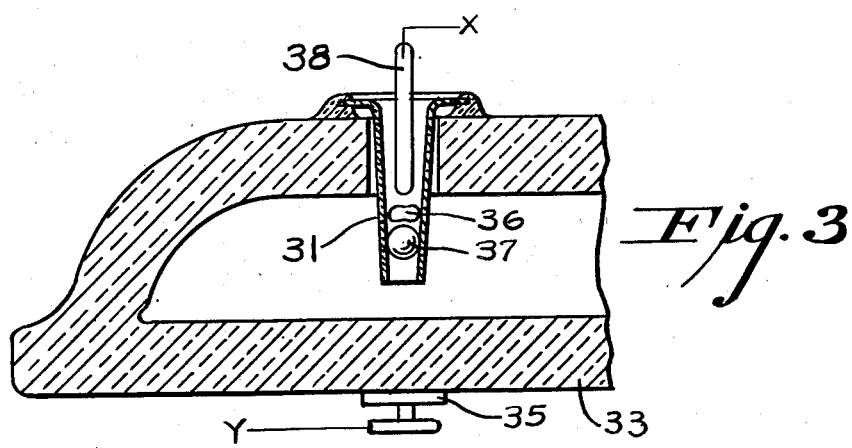
INVENTOR.
MORTON R. SHAW
BY Rolfe Schneider
ATTORNEY.

United States Patent Office 2,795,018
Patented June 11, 1957

2,795,018
DOUBLE-GLAZED CELLS

Morton R. Shaw, Corning, N. Y., assignor to Corning Glass Works, Corning, N. Y., a corporation of New York Application March 4, 1954, Serial No. 414,176

25 Claims. (Cl. 20—56.5)

The present invention relates to double-glazed cells or windows and has particular relation to the sealing of pores or vents employed for equalization of the pressures between the inside and the outside of such a cell or window.

A double-glazed window unit, which comprises two sheets of glass in spaced parallel relationship, is generally fabricated either by joining the glass sheets along their edges to a spacer of a metal or some other material or by fusing such sheets to each other along their edges as taught for example in Patent No. 2,389,360 to Edwin M. Guyer, Jeese T. Littleton and Morton R. Shaw, Jr. In the fabrication of such a unit in accordance with the latter procedure, the glass sheets are necessarily heated to a high temperature in order to effect the desired seal, with the result that the air between the glass sheets becomes highly heated and expands. To prevent collapse of the unit upon cooling to atmospheric temperature, it is necessary to provide a vent or pore in one of the sheets so that the pressures between the inside and the outside of the unit can be equalized.

As will be obvious, such vent or pore must be closed to prevent the entry of water vapor into the interior of the unit. While it would seem a relatively simple matter to close such a pore, such is actually not the case. Not only is it essential that such pore seal itself remain intact throughout the useful life of the window unit, but it is also necessary to effect such closure without damage to the glass sheet containing the vent or pore. The magnitude of this problem will be fully appreciated when it is realized that not only is it desirable to employ an opening as small as possible but that, if such opening is closed after the glass sheets have been sealed together, such closure must be effected without reheating the entire unit.

The primary object of the present invention accordingly is the provision of an improved system for readily and simply effecting closure of such a pore without damage to the double-glazed window unit itself.

A further object of the invention is the provision of such a double-glazed window unit embodying an improved pore closure or seal.

According to one form of embodiment of the invention, a capillary tube or sleeve provided with an outwardly extending flange at its outer end is inserted into the pore, the length of such tube or sleeve being such that its inner end projects into the space between the two glass sheets, the maximum diameter of such flange being greater than the diameter of the pore. Bonding of the flange to the outer surface of the glass sheet containing the pore is effected by appropriate heating and fusion of a solder glass (a glass having a working point substantially lower than that of the glass from which the sheets are fabricated), which either can be precoated on the flange or on that portion of the outer surface of the glass sheet surrounding the opening or can be suitably positioned between the flange and the outer surface of the glass sheet during insertion of the tube into the opening. The tube or sleeve may be composed either of a metal or a glass, the thermal expansion coefficient thereof advantageously closely matching that of the glass sheets as well as that of the solder glass. Final closure of the pore may be accomplished by means of either a metallic solder if the sleeve is composed of a metal or a glass solder and is advantageously effected by positioning a solder glass bead within the tube or sleeve at its inner end and suitably heating such solder glass bead as by induction heating or dielectric-loss heating until its fuses to the surrounding tubular wall.

In another form of embodiment of the invention, at least the outer end of the tube or sleeve is outwardly flared, and the pore is provided with an inwardly tapering surface for engagement by such flare. Bonding of the flare to the tapered surface of the pore and final closure of the pore are effected in manners similar to those described above.

For a better understanding of the invention, reference is made to the accompanying drawings wherein:

Fig. 1 is a sectional elevation of a double-glazed window unit embodying one form of a pore seal assembly according to the present invention, one type of associated facility for applying heat to effect closure of the seal being diagrammatically shown.

Fig. 2 is a sectional fragmental view showing an alternative form of the pore seal assembly illustrated in Fig. 1 and also showing an alternative manner of effecting closure of the seal by means of the heating facility illustrated in Fig. 1.

Fig. 3 is a sectional fragmental view corresponding to Fig. 1 and showing an alternative type of heating facility for effecting closure of the seal.

Figure 4:
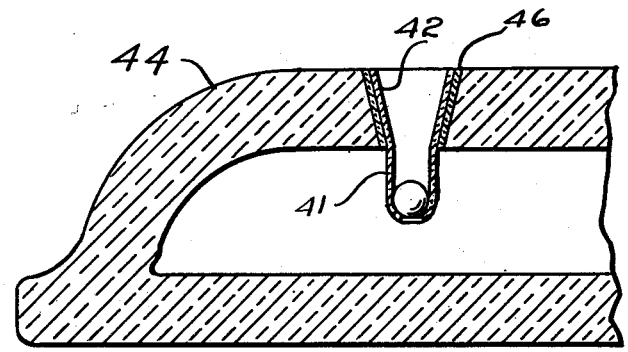
Fig. 4 is a sectional fragmental view showing an alternative form of embodiment of the pore seal assembly according to the invention.

The construction illustrated in Fig. 1 includes a tube or sleeve 11 tapered inwardly toward its inner end and having an outwardly extending flange 12 at its outer end. As indicated, sleeve 11 projects through aperture 15 provided in sheet 14 of the double-glazed unit, and its flange 12 is bonded to the outer surface of such sheet by means of a suitable solder glass 16.

To effect closure of the passage through the sleeve, a bead 17 of a suitable solder glass is arranged in the bore of the inner end of the sleeve and is heated until it softens and fuses to the inner surface of the wall of the sleeve. Such local heating can be accomplished by placing a high-frequency induction coil 18 adjacent sheet 13 of the unit at a point opposite the inner end of the tube 11, which is composed of a suitable metal in such case, and inductively heating its inner end to thereby soften the bead by conduction until the desired seal is effected. In order to prevent the transmission of excessive heat by conduction through the tube 11 to its flanged end and thus to the solder glass seal 16, a copper plug 19 may be temporarily inserted into the tube bore to divert such excessive heat to itself. To avoid overheating of such solder glass seal 16 as well as undue heating of the sheet 14, in addition the diameter of tube 11 is advantageously such that it is spaced from the wall of opening 15 throughout substantially its entire length. By effecting closure of tube 11 within the space between sheets 13 and 14, moreover, there is still less likelihood that the heat required for such purpose will directly affect the solder glass seal 16.

In the structure of Fig. 2, the sleeve 21 is in the form of a tube with an inturned flange 23 at its inner end and is composed of a suitable glass; and the bead of solder glass 27 initially positioned within tube 21 contains a metal slug 29 which is inductively heated by means of a coil such as 18 (Fig. 1) and which thus in turn heats the bead 27 by conduction until the same flows into sealing relation with tube 21. As in the arrangement of Fig. 1, tube 21 is provided at its outer end with an outwardly extending flange 22, which is similarly bonded to the outer surface of sheet 24 by the solder glass seal 26.

In the arrangement of Fig. 3, the bead 37 of solder glass has arranged thereover a mass of a high dielectric-loss material 36, such for example as manganese dioxide. Such material 36 is heated by including it in a high dielectric-loss circuit, as may be done by connecting one terminal X of a high-frequency current source to a probe electrode 38 and projecting such electrode into the sleeve 31, which is composed of a glass, and by connecting the other terminal Y of such source to a plate electrode 35 arranged next to the sheet 33 at a point opposite the inner end of the sleeve 31. Alternatively, the solder glass bead may be coated or otherwise associated with the high dielectric-loss material. As will be appreciated, heating of the solder glass bead is effected by conduction.

Figure 5:
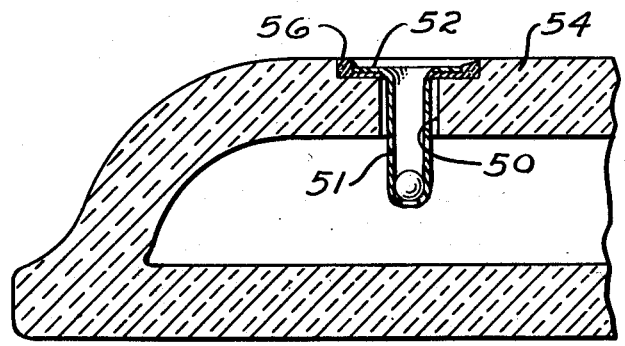
Fig. 5 is a sectional fragmental view showing an alternative form of the pore seal assembly illustrated in Fig. 2.
Figure 6:
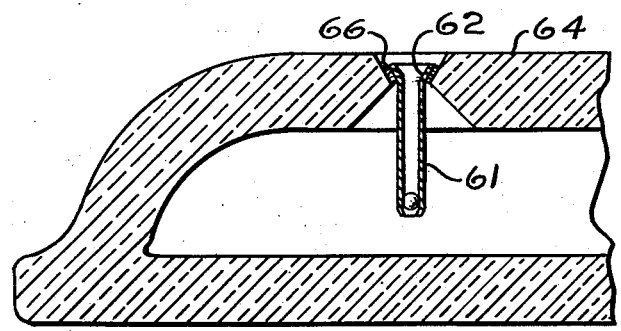
Fig. 6 is a sectional fragmental view showing an alternative form of the pore seal assembly illustrated in Fig. 4.

It may be undesirable in some instances to have any portion of the seal assembly project above the outer surface of the window. Figs. 4, 5 and 6 show alternative arrangements for avoiding this objection. In the structure of Fig. 4, the aperture is tapered outwardly toward the outer surface of sheet 44, and the outer portion 42 of the sleeve 41 is flared outwardly to match such tapered surface. Bonding of such flared portion to such tapered surface is effected by means of the solder glass 46, which may be appropriately interposed therebetween and suitably heated to effect its fusion. In the structure of Fig. 5 the exterior surface of sheet 54 immediately surrounding aperture 50 is recessed to a depth sufficient to accommodate the flange 52 of sleeve 51 and the solder glass seal 56 is thus made at a level below such exterior surface. In the structure of Fig. 6 the aperture is tapered outwardly toward both the exterior surface and the interior surface of sheet 64 and the tube 61 is provided with a matching outwardly flared portion 62 bonded to sheet 64 by means of solder glass 66.

The inner end of the sleeve may in each instance be alternatively sealed by means of a metallic solder, as indicated above, if the sleeve is composed of a metal; or any other suitable similar sealing medium may be employed for the purpose. It will also be appreciated that, where the sleeve has a diameter sufficiently less than that of the opening and especially where a double-tapered opening such as that shown in Fig. 6 is employed, it may not be necessary under some circumstances to have the sleeve project into the interior of the double-glazed unit.

As will be understood, the employment of a tapered sleeve such as 11 and 31, or a straight-bore sleeve such as 21, 51, or 61 with an inturned inner end is largely a matter of choice. It is also to be understood that, while the closure assembly is conveniently effected in its entirety after the double-glazed unit has been fabricated, the sleeve may be inserted in the pore opening prior to sealing of the glass sheets together and then bonded to the glass sheets surrounding the opening during such sealing operation. It will be further appreciated that the present invention also finds utility in sealing openings in other types of hollow glass bodies.

The utilization of dielectric-loss heating to fuse a solder glass bead and thereby effect closure of a glass tubulation extending through an opening in a wall of a hollow glass body into the interior thereof is broadly claimed in the copending application of Joseph E. Nitsche, Ser. No. 414,127, filed of even date herewith. The closure of such a tubulation by heating and fusing a solder glass bead is also broadly claimed in such Nitsche application.

What is claimed is:

1. A hollow glass body having an opening thereinto through a wall thereof, and a closure for such opening comprising a sleeve projecting therethrough into the cavity of such body, at least the outer portion of said sleeve extending outwardly, said portion being secured to the body wall by a vitreous bond of a solder glass, the passage through said sleeve being closed adjacent its inner end to establish a seal between the body cavity and the external atmosphere.

2. A structure such as defined by claim 1, in which the sleeve, the solder glass, and the glass body are all closely matching in thermal expansion coefficient.

3. A structure such as defined by claim 2 in which the sleeve is composed of a metal.

4. A structure such as defined by claim 2 in which the sleeve is composed of a glass.

5. A hollow glass body having an opening thereinto through a wall thereof, said opening tapering outwardly toward the outer surface of said body wall, and a closure for such opening comprising a sleeve projecting therethrough into the cavity of such body, at least the outer portion of said sleeve being outwardly flared, said flared portion being secured to the outwardly tapering surface of said opening by a vitreous bond of a solder glass, the inner end of said sleeve being closed by a seal formed from a solder glass.

6. A structure such as defined by claim 5 in which the opening also tapers outwardly toward the inner surface of the body wall.

7. A hollow glass body having an opening thereinto through a wall thereof, and a closure for such opening comprising a sleeve projecting therethrough into the cavity of such body and having a diameter less than that of the opening, said sleeve being spaced from the opening wall and having an outwardly extending flange at its outer end, said flange being secured to that portion of the outer surface of the body wall surrounding the opening by a vitreous bond of a solder glass, the inner end of said sleeve being closed by a seal formed from a solder glass.

8. A structure such as defined by claim 7 in which the portion of the outer surface of the body wall surrounding the opening is recessed and the flange is secured to such recessed portion.

9. A hollow glass body having an opening thereinto through a wall thereof, and a closure for such opening comprising a sleeve projecting thereinto and having a diameter less than that of the opening, said sleeve being spaced from the opening wall and having an outwardly extending portion at its outer end, said portion being secured to the body wall by a vitreous bond of a solder glass, the passage through said sleeve being closed adjacent its inner end to establish a seal between the body cavity and the external atmosphere.

10. A double-glazed window unit comprising a pair of glass plates disposed in spaced parallel relation and sealed to each other along their edges, one of said glass plates having an opening therethrough, and a closure for such opening comprising a sleeve projecting therethrough into the space between such glass plates, at least the outer portion of said sleeve extending outwardly, said portion being secured to the glass plate by a vitreous bond of a solder glass, the passage through said sleeve being closed adjacent its inner end to establish a seal between the space between the glass plates and the external atmosphere.

11. A double-glazed window unit comprising a pair of glass plates disposed in spaced parallel relation and sealed to each other along their edges, one of said glass plates having an opening therethrough, and a closure for such opening comprising a sleeve projecting thereinto and having a diameter less than that of the opening, said sleeve being spaced from the opening wall and having an outwardly extending portion at its outer end, said portion being secured to the glass plate by a vitreous bond of a solder glass, the passage through such sleeve being closed adjacent its inner end to establish a seal between the space between the glass plates and the external atmosphere.

12. A method of closing an opening extending through a wall of a hollow glass body, which includes inserting in such opening a sleeve at least the outer portion of which extends outwardly, said sleeve being of such length that it projects into the cavity of such body, interposing a solder glass between said outwardly extending portion and the body wall, heating such assembly to fuse the solder glass and thereby bond said portion to the body wall, and effecting closure of the sleeve passage adjacent its inner end to establish a seal between the body cavity and the external atmosphere.

13. A method of closing an opening extending through a wall of a hollow glass body, which includes inserting in such opening a sleeve at least the outer portion of which extends outwardly, said sleeve being of such length that it projects into the cavity of such body, interposing a solder glass between said outwardly extending portion and the body wall, heating such assembly to fuse the solder glass and thereby bond said portion to the body wall, positioning a bead of a solder glass in the passage of such sleeve at its inner end, and heating such solder glass bead to fuse the same to the surrounding passage wall.

14. A method such as defined by claim 13 in which the sleeve is composed of a metal and fusion of the solder glass bead is effected by induction heating of the metal sleeve, while preventing the deleterious heating of the sleeve in the region of the sleeve-body wall seal by introducing a heat-absorbing member into the outer end of the sleeve during fusion of the solder glass bead.

15. A method such as defined by claim 14 which includes introducing a heat-absorbing member into the outer end of the sleeve during fusion of the solder glass bead.

16. A method such as defined by claim 13 in which the sleeve is composed of a glass, metal is embodied in the solder glass bead and fusion of the solder glass bead is effected by induction heating of such metal.

17. A method such as defined by claim 13 which includes arranging a high dielectric-loss material adjacent the solder glass bead, and in which the sleeve is composed of a glass and fusion of the solder glass bead is effected by dielectric-loss heating of such material.

18. A method such as defined by claim 13 in which the solder glass bead is coated with a high dielectric-loss material, the sleeve is composed of a glass, and fusion of the solder glass bead is effected by dielectric-loss heating of such material.

19. A method such as defined by claim 13 in which the sleeve is tapered inwardly toward its inner end.

20. A method such as defined by claim 13 in which the sleeve is provided with an inturned flange at its inner end.

21. A method of closing an opening extending through a wall of a hollow glass body, which includes inserting in such opening a sleeve having a diameter sufficiently less than that of the opening that said sleeve is spaced from the opening wall, said sleeve having an outwardly extending flange at its outer end and being of such length that it projects into the cavity of such body, interposing a solder glass between said flange and that portion of the outer surface of the body wall surrounding the opening, heating such assembly to fuse the solder glass and thereby bond said flange to the body wall, positioning a bead of a solder glass in the passage of such sleeve at its inner end, and heating such solder glass bead to fuse the same to the surrounding passage wall.

22. A method of closing an opening extending through a wall of a hollow glass body, said opening tapering outwardly toward the outer surface of said body wall, which includes inserting in such opening a sleeve at least the outer portion of which is outwardly flared, said sleeve being of such length that it projects into the cavity of such body, interposing a solder glass between said flared portion of the sleeve and the outwardly tapering surface of said opening, heating such assembly to fuse the solder glass and thereby bond said portion to said surface, positioning a bead of solder glass in the passage of such sleeve at its inner end, and heating such solder glass bead to fuse the same to the surrounding passage wall.

23. A method of closing a passage extending through a wall of a hollow glass body, said passage being embodied in part in a glass tubulation occupying the cavity of the body, which includes positioning at the inner end of the passage a bead of a solder glass, associating a metal with such solder glass bead, and inductively heating such metal to thereby heat the solder glass bead by conduction and to fuse the same to the surrounding passage wall.

24. A method of closing an opening extending through a wall of a hollow glass body, which includes inserting in such opening a sleeve having a diameter sufficiently less than that of the opening that said sleeve is spaced from the opening wall, said sleeve having an outwardly extending portion at its outer end, interposing a solder glass between said portion and the body wall, heating such assembly to fuse the solder glass and thereby bond said portion to the body wall, and effecting closure of the sleeve passage adjacent its inner end to establish a seal between the body cavity and the external atmosphere.

25. A hollow glass body having an opening thereinto through a wall thereof, a closure for such opening comprising a sleeve projecting thereinto and having a diameter less than that of the opening, said sleeve being spaced from the opening wall and having an outwardly extending portion at its outer end, and a vitreous bond of a solder glass extending solely between such portion and the adjacent body wall, the passage through said sleeve being closed adjacent its inner end to establish a seal between the body cavity and the external atmosphere.

References Cited in the file of this patent

UNITED STATES PATENTS

| | | |
|---|---|---|
| 2,389,360 | Guyer et al. | Nov. 20, 1945 |
| 2,683,906 | Nevins | July 20, 1954 |
| 2,686,342 | D'Eustachio | Aug. 17, 1954 |
| 2,736,143 | Ford | Feb. 28, 1956 |
| 2,749,579 | Shaw | June 12, 1956 |